United States Patent
Schrammar et al.

(10) Patent No.: US 10,805,121 B2
(45) Date of Patent: Oct. 13, 2020

(54) WIRELESS DEVICE, AND METHOD PERFORMED THEREIN FOR MANAGING COMMUNICATION IN A WIRELESS COMMUNICATION NETWORK

(71) Applicant: Telefonaktiebolaget LM Ericsson (publ), Stockholm (SE)

(72) Inventors: Nicolas Schrammar, Solna (SE); Ashim Biswas, Sollentuna (SE); Marc Bohlin, Järfälla (SE); Anders Elgcrona, Täby (SE); Magnus Wikström, Sollentuna (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/473,829

(22) PCT Filed: Jan. 2, 2017

(86) PCT No.: PCT/SE2017/050003
§ 371 (c)(1),
(2) Date: Jun. 26, 2019

(87) PCT Pub. No.: WO2018/124954
PCT Pub. Date: Jul. 5, 2018

(65) Prior Publication Data
US 2019/0356514 A1    Nov. 21, 2019

(51) Int. Cl.
*H04L 25/02* (2006.01)
*H04B 7/06* (2006.01)
(Continued)

(52) U.S. Cl.
CPC ....... *H04L 25/0224* (2013.01); *H04B 7/0617* (2013.01); *H04B 17/318* (2015.01);
(Continued)

(58) Field of Classification Search
CPC ..... H04L 25/0224; H04L 1/0618; H04L 1/06; H04L 25/0204; H04B 17/318;
(Continued)

(56) References Cited

U.S. PATENT DOCUMENTS

| 9,191,957 B2 | 11/2015 | Kim et al. |
| 2010/0182903 A1* | 7/2010 | Palanki ................ H04J 11/005 370/225 |

(Continued)

FOREIGN PATENT DOCUMENTS

| WO | WO 2015/147717 A1 | 10/2015 |
| WO | WO 2016/008528 A1 | 1/2016 |

OTHER PUBLICATIONS

International Search Report and Written Opinion of the International Searching Authority, PCT/SE2017/050003, dated Aug. 14, 2007, 17 pages.

(Continued)

*Primary Examiner* — Ted M Wang
(74) *Attorney, Agent, or Firm* — Sage Patent Group (57) ABSTRACT

Embodiments herein relate to a method performed by a wireless device for managing communication in a wireless communication network. The wireless device receives reference signals from one or more radio network nodes. The wireless device estimates to what extent the received reference signals are received spatially diversified. The wireless device then generates a measurement report by adding selected reference signals into the measurement report, which reference signals are selected for simultaneous multiple transmissions of data to the wireless device taking into account the estimated extent that the received reference signals are received spatially diversified. The wireless device then transmits the measurement report to a radio network node in the wireless communication network.

13 Claims, 6 Drawing Sheets

(51) Int. Cl.
  *H04B 17/318* (2015.01)
  *H04B 17/364* (2015.01)
  *H04W 24/10* (2009.01)
  H04B 7/022 (2017.01)
  H04B 7/0408 (2017.01)
  H04B 7/10 (2017.01)

(52) U.S. Cl.
  CPC .......... *H04B 17/364* (2015.01); *H04W 24/10* (2013.01); *H04B 7/022* (2013.01); *H04B 7/0408* (2013.01); *H04B 7/10* (2013.01)

(58) Field of Classification Search
  CPC .. H04B 17/364; H04B 7/0617; H04B 7/0417; H04B 7/0669; H04W 24/10
  See application file for complete search history.

(56) References Cited

U.S. PATENT DOCUMENTS

| | | | | |
|---|---|---|---|---|
| 2011/0319025 | A1* | 12/2011 | Siomina | H04B 7/0617 455/63.1 |
| 2013/0329772 | A1* | 12/2013 | Wernersson | H04B 7/0469 375/219 |
| 2014/0334566 | A1 | 11/2014 | Kim et al. | |
| 2014/0349582 | A1* | 11/2014 | Xiao | G01S 5/10 455/67.11 |
| 2016/0234706 | A1* | 8/2016 | Liu | H04L 5/0048 |
| 2018/0092111 | A1* | 3/2018 | Chaudhuri | H04L 5/0048 |

OTHER PUBLICATIONS

Nokia, Alcatel-Lucent Shanghai Bell, "Beam Recovery in NR", 3GPP TSG-RAN WG2 Meeting #96, Reno, USA, Nov. 14-18, 2016, R2-167713, 4 Pages.

Qualcomm, "Beam Management for NR", 3GPP TSG RAN1 86B, Reno, NV, Nov. 14-18, 2016, R1-1612056, 4 Pages.

Ericsson, "Active Mode Mobility in NR: SINR drops in higher frequencies", 3GPP TSG-RAN WG2 #93bis, Dubrovnik, Croatia, Apr. 11-15, 2016, Tdoc R2-162762, 4 Pages.

3GPP TR 38.913 V0.3.0 (Jun. 2016), 3rd Generation Partnership Project; Technical Specification Group Radio Access Network; Study on Scenarios and Requirements for Next Generation Access Technologies; (Release 14), 30 Pages.

NTT Docomo, New SID Proposal: Study on New Radio Access Technology, 3GPP TSG RAN Meeting #71, Göteborg, Sweden, Mar. 7-10, 2016, RP-160671, 8 Pages.

3GPP TR 23.799 V0.5.0 (May 2016), 3rd Generation Partnership Project; Technical Specification Group Services and System Aspects; Study on Architecture for Next Generation System (Release 14), 178 Pages.

* cited by examiner

WIRELESS DEVICE, AND METHOD PERFORMED THEREIN FOR MANAGING COMMUNICATION IN A WIRELESS COMMUNICATION NETWORK

This application is a 35 U.S.C. § 371 national stage application of PCT International Application No. PCT/SE2017/050003 filed on Jan. 2, 2017, the disclosure and content of which is incorporated by reference herein in its entirety.

TECHNICAL FIELD

Embodiments herein relate to a wireless device, and method performed therein regarding wireless communication. Furthermore, a computer program and a computer-readable storage medium are also provided herein. In particular, embodiments herein relate to managing communication in a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a "NodeB" or "eNodeB". The service area or cell area is a geographical area where radio coverage is provided by the access node. The access node operates on radio frequencies to communicate over an air interface with the wireless devices within range of the access node. The access node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Overall requirements for the Next Generation (NG) architecture e.g. TR 23.799 v.0.5.0, and, more specifically the NG Access Technology, e.g. TR 38.913 v.0.3.0 will impact the design of the Active Mode Mobility solutions for the New Radio Access Technology (NR), see RP-160671 New SID Proposal: Study on New Radio Access Technology, DoCoMo, compared to the current mobility solution in LTE. Some of these requirements are the need to support network energy efficiency mechanisms, future-proof-ness and the need to support a very wide range of frequencies e.g. up to 100 GHz.

One of the main differences, with respect to LTE, comes from the fact that propagation in frequencies above the ones allocated to LTE is more challenging so that the massive usage of beamforming becomes an essential component of NR. Despite the link budget gains provided by beamforming solutions, reliability of a system purely relying on beamforming and operating in higher frequencies might be challenging, since the coverage might be more sensitive to both time and space variations. As a consequence of that a Signal to Interference plus Noise Ratio (SINR) of a narrow link can drop much quicker than in the case of LTE, see R2-162762, Active Mode Mobility in NR: SINR drops in higher frequencies, Ericsson.

To support Transmit (Tx)-side beamforming at a radio network node, a number of reference signals (RS) may be transmitted from the radio network node, whereby the wireless device can measure signal strength or quality of these reference signals and report the measurement results to the radio network node. The radio network node may then use these measurements to decide which beam(s) to use for the one or more wireless devices.

A combination of periodic and scheduled reference signals may be used for this purpose.

The periodic reference signals, typically called beam reference signals (BRS) or Mobility Reference Signals (MRS), are transmitted repeatedly, in time, in a large number of different directions using as many Tx-beams as deemed necessary to cover a service area of the radio network node.

As the naming indicates, each BRS represents a unique Tx-beam from that radio network node. This allows a wireless device to measure the BRS when transmitted in different beams, without any special arrangement for that wireless device from the radio network node perspective. The wireless device reports e.g. the received powers for different BRSs, or equivalently different Tx-beams, back to the radio network node.

The scheduled reference signals, called channel-state information reference signals (CSI-RS), are transmitted only when needed for a particular connection. The decision when and how to transmit the CSI-RS is made by the radio network node and the decision is signaled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a NR network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

Beamforming introduces a possibility to enhance the signal toward a specific location. This enables better signal to noise ratio toward a specific wireless device.

A specific beamforming toward a specific wireless device is handled per Transmission Time Interval (TTI) where a number of factors and measurements are used to determine how the beamforming should look like. With an increasing number of antenna elements, the number of possible beams that theoretically can be created increases a lot.

A wireless communication system comprises radio network nodes, also referred to as transmission points (TPs), and wireless devices. The radio network nodes employ beamforming, that is, the radio network nodes transmit their power in a prominent direction to increase the received power at the wireless devices. A radio network node may use a certain beamforming where beams are used from a finite set of pre-defined beams. It should also be understood the radio network node can use several of the beams at a same time. The radio network node periodically sends reference signals on each of the possible beams, such as the BRS or MRS.

The wireless device measures signal strength or quality such as reference signal received power (RSRP) for each of the reference signals e.g. beam reference signal received power (BRSRP). The wireless device then reports the signal strength or quality back to the radio network node.

There are two properties of the reporting:

Firstly, the wireless device is only able to report a finite number of signal strengths or qualities. This is to limit communication resources in the uplink;

Secondly, the wireless device only reports the position of the detected reference signal in time and possibly frequency domain. The wireless device does not know what radio network node that sent the reference signal and what beam was used at the radio network node. This transparency of radio network node and beam information has the advantage of providing flexible reference signal transmissions. That is, the radio network nodes can change when and from what radio network node the reference signals are sent, without sending this information to the wireless devices.

The wireless devices report the reference signals with the highest signal strengths or qualities and corresponding indications identifying which reference signals are reported. The two properties mentioned above may in some situations limit the number of beams reported back and this may result in that some important information is not collected at the radio network node. This may result in a poor selection of beams for the wireless device reducing or limiting performance of the wireless communication network.

SUMMARY

An object of embodiments herein is to provide a mechanism that improves the performance of the wireless communication network when performing beamforming in a wireless communication network when using multiple transmissions of data toward a wireless device.

According to an aspect the object is achieved by providing a method performed by a wireless device for managing communication in a wireless communication network. The wireless device receives reference signals from one or more radio network nodes. The wireless device estimates to what extent the received reference signals are received spatially diversified. The wireless device generates a measurement report by adding selected reference signals into the measurement report, which reference signals are selected for simultaneous multiple transmissions of data to the wireless device taking into account the estimated extent that the received reference signals are received spatially diversified. The wireless device transmits the measurement report to a radio network node in the wireless communication network.

According to another aspect the object is achieved by providing a wireless device for enabling managing communication in a wireless communication network. The wireless device is configured to receive reference signals from one or more radio network nodes, and to estimate to what extent the received reference signals are received spatially diversified. The wireless device is further configured to generate a measurement report by adding selected reference signals into the measurement report, which reference signals are selected for simultaneous multiple transmissions of data to the wireless device taking into account the estimated extent that the received reference signals are received spatially diversified. Furthermore, the wireless device is configured to transmit the measurement report to a radio network node in the wireless communication network.

It is herein also provided a computer program comprising instructions, which, when executed on at least one processor, causes the at least one processor to carry out the methods herein, as performed by the wireless device. Furthermore, it is herein provided a computer-readable storage medium, having stored thereon a computer program comprising instructions which, when executed on at least one processor, cause the at least one processor to carry out the methods herein, as performed by the wireless device.

According to embodiments herein wherein the measurement report is generated and comprises certain reference signals, based on the estimated spatial diversity, e.g. different directions, of the reference signals. E.g. reference signals from a same direction as another reference signal, i.e. having a low spatial diversity, are down prioritized to be included into the measurement report. Thus, reference signals estimated to come from different directions, i.e. having a high spatial diversity, may be weighted with a higher value or prioritized to be included into the measurement report and are sent in the measurement report to e.g. a radio network node serving the wireless device. The radio network node may then decide which reference signals in the measurement report that should be used for simultaneous multiple transmissions of data to the wireless device.

The reference signals or beams of the reference signals reported are likely to have lower correlation resulting in a use of a MIMO channel, i.e. the simultaneous multiple transmissions, likely to have a higher rank and resulting in a higher throughput and leading to an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
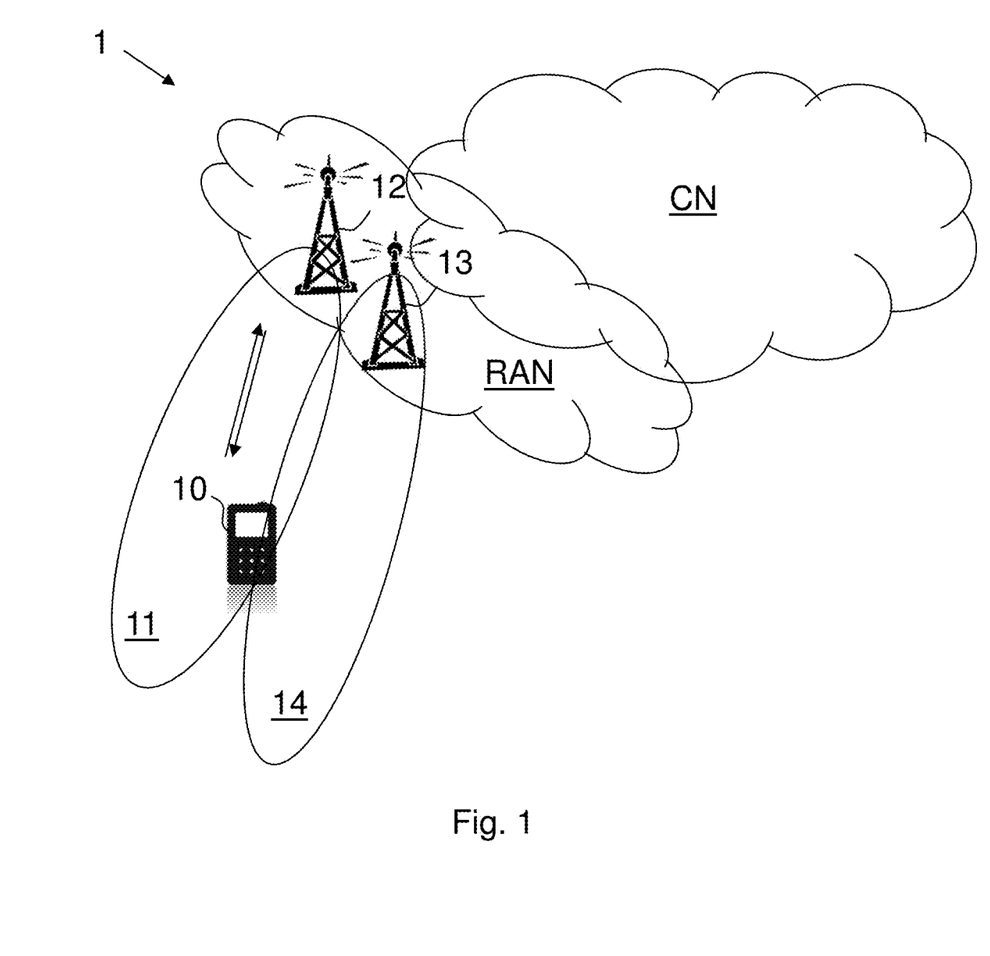
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use one or a number of different technologies, such as Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a radio network node within an area served by the radio network node.

The wireless communication network 1 comprises a radio network node 12, also referred to as a first radio network node, providing radio coverage over a geographical area, a first service area 11 or a first beam, of a first radio access technology (RAT), such as NR, LTE, Wi-Fi, WiMAX or similar. The radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the radio network node 12 depending e.g. on the first radio access technology and terminology used. The radio network node 12 may be referred to as a serving radio network node wherein the first service area may be referred to as a serving beam, and the radio network node serves and communicates with the wireless device 10 in form of DL transmissions to the wireless device 10 and UL transmissions from the wireless device 10.

A second radio network node 13 may further provide radio coverage over a second service area 14 or a second beam of a second RAT, such as NR, LTE, Wi-Fi, WiMAX or similar. The first and second RAT may be the same RAT or different RATs. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour radio network node wherein the second service area 14 may be referred to as a neighbouring beam.

It should be noted that a service area may be denoted as a cell, a beam, a mobility measurement beam, a beam group or similar to define an area of radio coverage. The radio network nodes transmit RSs over respective service area. Hence, the first and second radio network nodes transmit MRSs or beam reference signals (BRS), repeatedly, in time, in a large number of different directions using as many Tx-beams as deemed necessary to cover an operational area of the respective radio network node. Hence the radio network node 12 provides radio coverage over the first service area using a first reference signal, e.g. a first MRS. The second radio network node 13 provides radio coverage over the second service area 14 using a second reference signal, e.g. a second MRS. These reference signals, first and second MRS, may be initiated upon request from a radio network node, e.g. a neighboring radio network node, or configured to be sent continuously. The wireless device 10 may not know identity of the radio network node 12 from the RS and this gives the wireless communication network a greater flexibility to use e.g. BRS IDs, i.e., a certain ID of a reference signal does not have to be reserved for a certain radio network node.

A radio network node can use a limited number x of beams at the same time for data transmission. If the wireless device is located close to the radio network node, it is likely to receive many strong reference signals from the same radio network node. Assume that the wireless device 10 can report y reference signals, where y>x. If the wireless device 10 reports more than x reference signals from the same radio network node, this information is useless, because the radio network node is unable to utilize the beams corresponding to the reference signals, and Candidate reference signals, i.e. reference signals transmitted from other radio network nodes may not be reported.

Furthermore, it is generally preferably to transmit data on beams that reach the wireless device from different directions, i.e. spatially diversified, in MIMO transmissions. This is because of fundamental properties of multi-antenna systems. A beam can reach the wireless device from different directions if i) the beams originate from different radio network nodes or ii) the beams is reflected on its way from the radio network node to the wireless device. At the same time, the strongest reference signals are likely to stem from line-of-sight beams transmitted by the closest radio network node. Therefore, reporting the strongest reference signals is likely to result in a poor selection of beam candidates, in case simultaneously data transmissions on multiple beams are desired.

The wireless device 10 according to embodiments herein generates a measurement report by adding selected reference signals to be reported to e.g. the radio network node 12 for simultaneous multiple transmissions of data toward the wireless device, i.e. for MIMO transmission of a rank equal to two or higher. Thus, the wireless device 10 estimates to what extent the received reference signals are received spatially diversified and then generates the measurement report comprising reference signals that correspond to beam candidates, which beam candidates are likely to result in a high throughput when performing a MIMO transmission of data on multiple layers. Hence, the generated measurement report comprises indications of references signals and e.g. corresponding strength values of reference signals, which reference signals are estimated to be spatially diversified for simultaneous multiple transmissions of data toward the wireless device 10. The reference signals, or beams associated to the reference signals, reported according to embodiments herein are likely to have a low correlation and the resulting MIMO channel is therefore likely to have a higher rank and to result in a higher throughput.

Note that in a general scenario the term "radio network node" can be substituted with "transmission point". Several TPs may be logically connected to the same radio network node but if they are geographically separated, or are pointing in different propagation directions, the TPs will be subject to the same issues as different radio network nodes. In subsequent sections, the terms "radio network node" and "TP" can be thought of as interchangeable.

Figure 2:
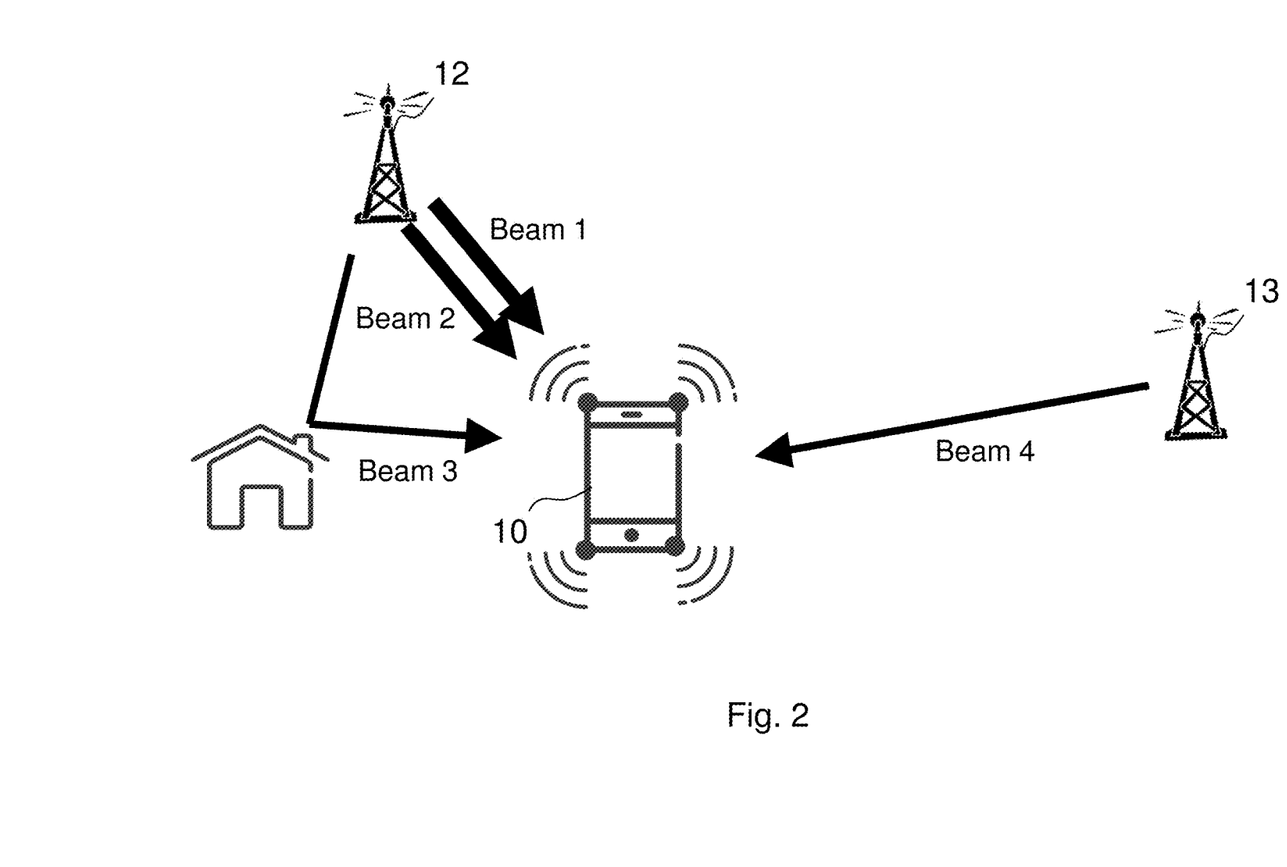
FIG. 2 shows a schematic overview depicting a scenario in a wireless communication network according to embodiments herein.

FIG. 2 shows a schematic overview illustrating how different RSs, or beams associated to respective RS, reach the wireless device 10. Beams 1 and 2 originate from the same radio network node, e.g. the radio network node 12, and are received via line-of-sight at the wireless device 10. The corresponding reference signals have the highest received power values, such as Reference Signal Received Power (RSRP) values, however, they are likely to result in a poor throughput due to high correlation, i.e. the wireless device 10 will not be able to differentiate the beams and thus will not be able to use these beams for simultaneous multiple transmissions of data toward the wireless device 10. Beam 3 originates from the same radio network node 12, but is reflected before reaching the wireless device 10. Beam 4 originates from another radio network node such as the second radio network node 13. If the wireless device 10 is able to report two beams only, it should not report beam 1 and beam 2 as a pair, which have highest RSRP values. Instead, the wireless device 10 reports the pair of beam 1 and another beam that is spatially diversified with the strongest beam 1. Hence, the wireless device 10 combines the beam with a highest received strength or quality with a beam that has low similarity with respect to the beam 1, e.g. beam 3 or 4 in the illustrated example. This will improve simultaneous multiple transmissions of data to the wireless device 10, which simultaneous multiple transmissions define a MIMO rank of equal to or higher than two. A benefit of using MIMO is to send several transmission layers at a same time. One example is when using analogue beam forming, the radio network node 12 sends multiple beams to the wireless device 10. Each beam can support at most two transmission layers, because the beam contains two polarization directions. This means that up to 4 transmission layers can be transmitted when using two beams. The number of transmission layers may be limited by the correlation between the beams. Two beams are likely to be correlated if they propagate on the same path, e.g., if they are both received via line of sight. Correlation can be interpreted in two ways, which are mathematically the same: i) there is high interference between the two beams, which limits the throughput ii) the correlated channel forms transmission layers, of which some have poor attenuation, i.e., the transmission layers are weak and cannot carry much throughput. In this case, it is better to not use the full number of transmission layers. This is called a rank reduction. However, according to embodiments herein the reported references signal (or beams) are avoiding this rank reduction and MIMO transmissions with a rank of two or higher is facilitated by the generated measurement report.

Figure 3:
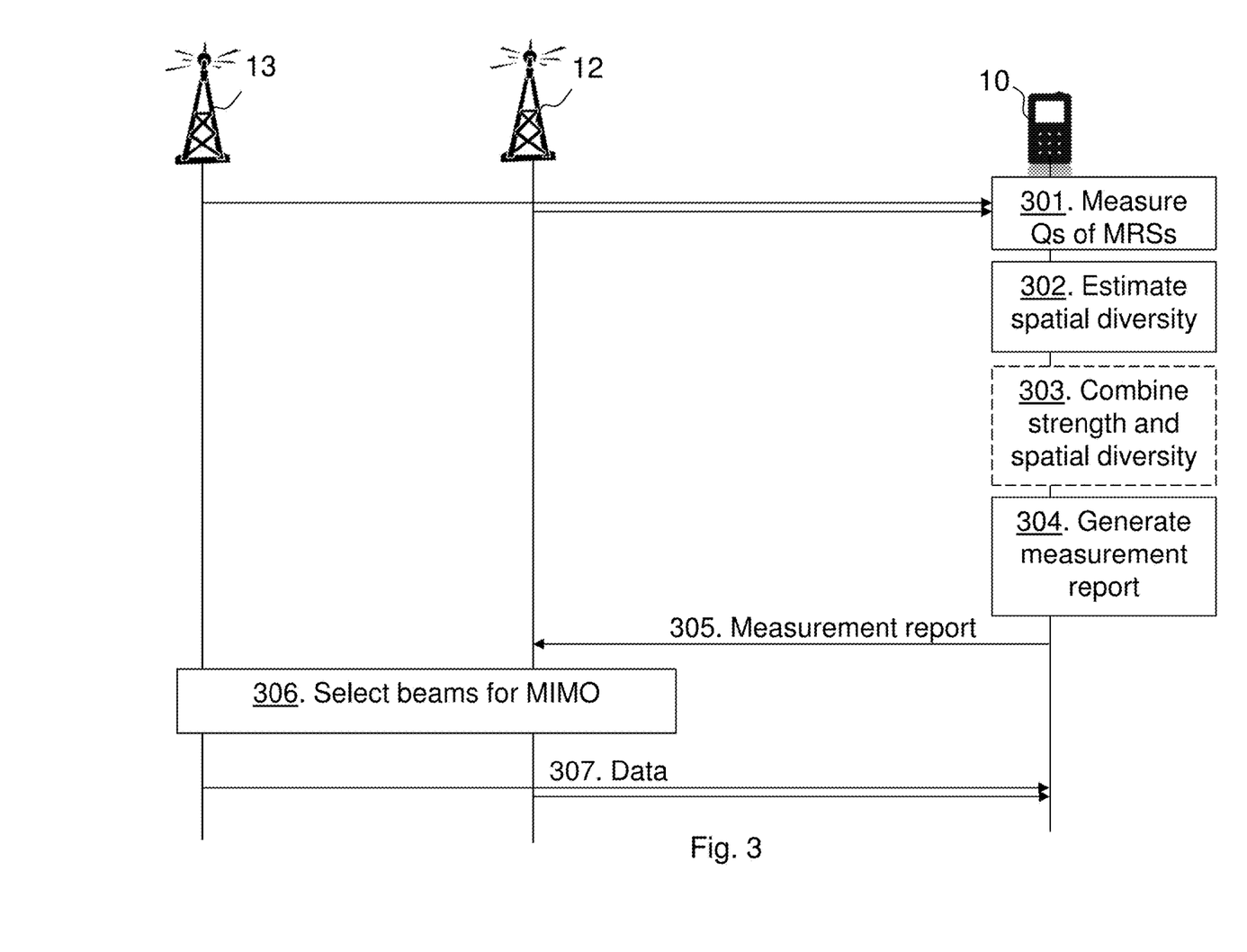
FIG. 3 is a schematic combined flowchart and signaling scheme according to embodiments herein.

FIG. 3 is a combined flowchart and signaling scheme according to embodiments herein. The wireless device 10 may be served by the radio network node 12 providing the radio coverage over the first service area 11 using the first reference signal for identifying the first service area 11 in the wireless communication network. The second radio network node 13 may provide radio coverage over the second service area 14 using the second reference signal for identifying the second service area 14 in the wireless communication network 1.

Action 301. The wireless device 10 receives reference signals from e.g. the radio network node 12 and the second radio network node 13. The wireless device 10 may measure signal strength or quality of the received reference signals. The RSs are each associated with an antenna port, i.e. when the wireless device 10 is performing a measurement using a particular reference signal, it can be equivalently said that the wireless device 10 is measuring the channel of the antenna port that corresponds to the particular reference signal. If the reference signal is beam-formed, i.e. transmitted with a multi-antenna precoding vector that generates a beam in a certain pointing direction, one can say that the wireless device 10 is measuring a port of a beam. Since the radio network node 12 may transmit multiple beams, the wireless device 10 may measure on multiple ports of beams in sequence or in parallel.

Action 302. The wireless device 10 estimates to what extent the references signals are spatially diversified. E.g. the wireless device 10 may determine level of differences of incoming directions of the reference signals compared to a received reference signal with highest measured signal strength or quality. As another example, the wireless device 10 may determine a first direction of a first reference signal, e.g. strongest reference signal, and a second direction of a second reference signal forming a deviance factor based on the determined first and second direction. To estimate to what extent the received reference signals are spatially diversified, i.e. to what extent the received reference signals originate from different radio network nodes and/or travel different propagation paths, the wireless device 10 may:

estimate a time difference of arrival of the reference signal at several antenna elements and the signal strength of a same reference signal at the several antenna elements. This gives an estimate of the received direction of the reference signal;

estimate a time difference of arrival of different reference signals. This gives an estimate of a length of a propagation path relative one another of the reference signals. This in turn indicates if the reference signal originates from different radio network nodes and/or the corresponding reference signal is received via reflections. If a reference signal is both received via reflection and via a direct path, this will result in time dispersion. This is a common phenomenon in multipath propagation. Two distinct reference signals are those that have distinct IDs that are transmitted from different radio network nodes and/or on different beams; and/or estimate a power difference of two polarization directions of a cross-polarized reference signal. Since a reflection may alter a polarization type of the reference signal and the power difference of the two polarization directions, this indicates that the reference signal is received via reflections.

Action 303. The wireless device 10 may according to some embodiments combine the strength and the estimate to what extent the received reference signals are spatially diversified. The wireless device 10 may e.g. calculate a metric for a similarity of each pair of reference signals, taking the estimates described above into account. An example is described in action 506 herein. The wireless device 10 may then maximize a metric that depends on the signal strength or quality as well as on the similarity (or dissimilarity) of the selected beams.

Action 304. The wireless device 10 then generates the measurement report with reference signals that are selected for simultaneous multiple transmissions of data to the wireless device 10. The wireless device 10 may then add reference signals and/or measurements of the reference signals to the measurement report based on whether the reference signals are received spatially diversified since spatial diversity facilitates or allows simultaneous multiple transmissions of data to the wireless device 10. The wireless device 10 may e.g. estimate directions of each of the received reference signal and take the estimated directions into account when adding measurements and reference signals into the measurement report.

Action 305. The wireless device 10 transmits the generated measurement report to e.g. the radio network node 12 serving the wireless device 10. Thus, the wireless device 10 reports the reference signals that correspond to good beam candidates for simultaneous multiple transmissions of data toward the wireless device 10. Being a good beam candidate is based on the estimation that the reference signals are spatially diversified. Thus, the wireless device 10 may transmit a measurement report comprising a first indication of an identity of a first reference signal with a strongest measured signal strength or quality and the corresponding measured signal strength or quality, and a second indication of an identity of a second reference signal with a measured signal strength or quality, which second reference signal is spatially diversified from the first reference signal and also corresponding measured signal strength or quality. Hence, the measurement report may indicate the added reference signals and the corresponding signal strength or quality of the added reference signals.

Action 306. The radio network node 12 receives the measurement report and may determine reference signals or beams to be used for simultaneous multiple transmissions of data toward the wireless device 10 based on the received measurement report. E.g. the measurement report is sent to a scheduler that may control several radio network nodes such as TPs. Potentially, the performance of the beam candidates determined by embodiments herein is evaluated further by using other mechanisms, e.g. using the CSI-RS in a NR network. Embodiments herein do not only take received strength into account, but estimates the throughput of using several beams concurrently. Based on those estimated throughputs, the scheduler decides which beams from which radio network node to use for which wireless device (s) at which time. Hence, the radio network node 12 decides on what beams the wireless device 10 will be scheduled.

Action 307. The radio network node 12 and/or the second radio network node 13 may then transmit data to the wireless device 10 in simultaneous multiple transmissions.

Figure 4:
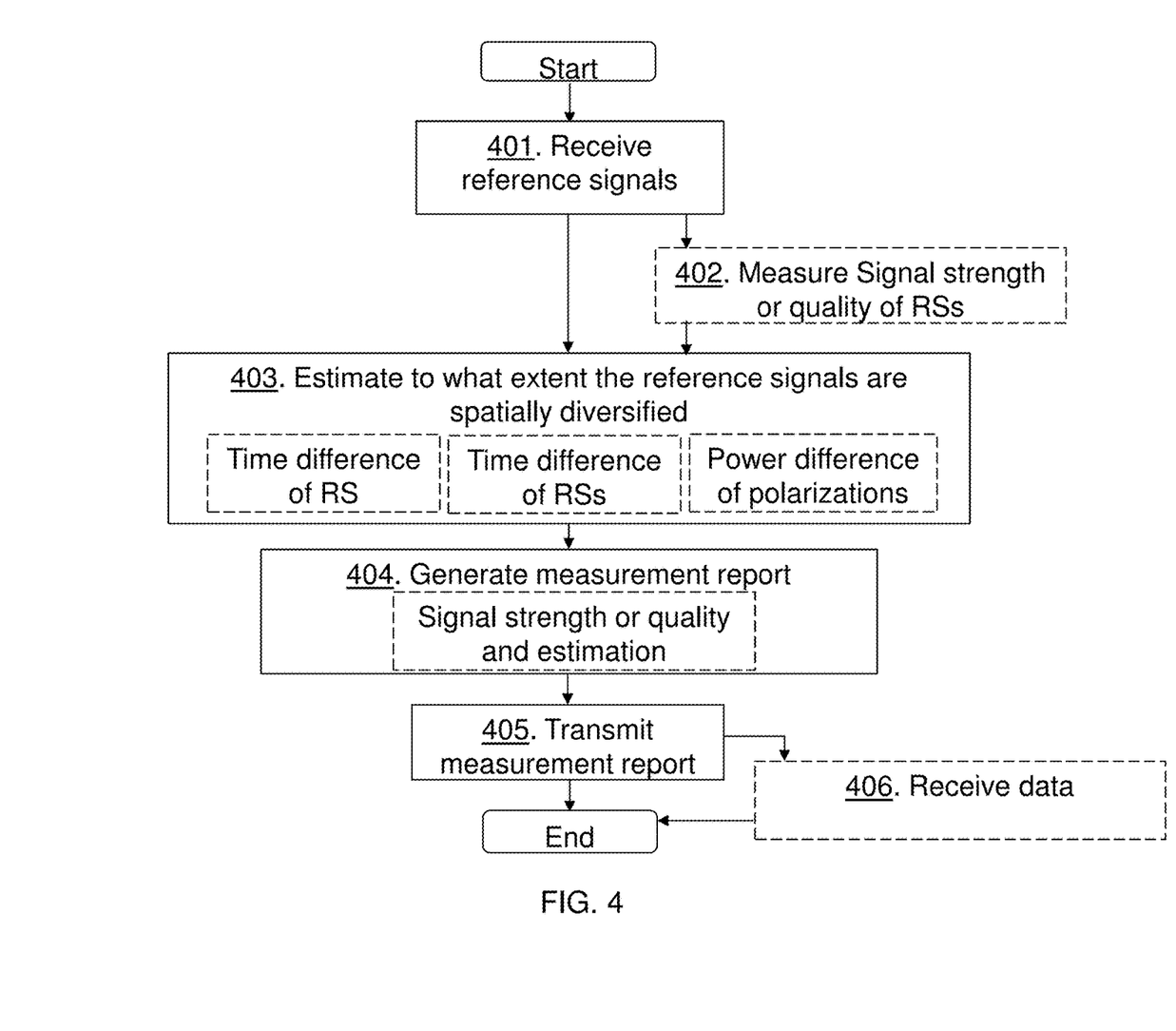
FIG. 4 is a schematic flowchart depicting a method performed by a wireless device according to embodiments herein.

The method actions performed by the wireless device 10 for managing or handling communication in the wireless communication network 1 according to some embodiments will now be described with reference to a flowchart depicted in FIG. 4. The actions do not have to be taken in the order stated below, but may be taken in any suitable order. Actions performed in some embodiments are marked with dashed boxes.

Action 401. The wireless device 10 receives the reference signals from one or more radio network nodes. The wireless device 10 may e.g. receive reference signals of different beams from the radio network node 12 and/or the second radio network node 13. This is exemplified in Action 301 in FIG. 3.

Action 402. The wireless device 10 may measure signal strength or quality of the received reference signals.

Action 403. The wireless device 10 estimates to what extent the received reference signals are received spatially diversified. The wireless device 10 may estimate to what extent the received reference signals are received spatially diversified by estimating a time difference of arrivals of a received reference signal at different antenna elements of the wireless device 10. This may indicate a direction to the received reference signal and how that direction differs from another reference signal may then be determined. The wireless device may estimate to what extent the received reference signals are received spatially diversified by estimating a time difference of arrivals of different reference signals at the wireless device 10. This may indicate a path length compared to a first reference signal e.g. a reference signal with a highest measured signal strength or quality. The wireless device 10 may estimate to what extent the received reference signals are received spatially diversified by estimating a power difference of different polarization directions of a reference signal at the wireless device 10. E.g. the wireless device 10 may compare the power difference with a known power difference of the received reference signals, e.g. 0, to determine that the reference signal has been reflected toward the wireless device 10. The wireless device

10 may additionally when estimating to what extent the received reference signals are received spatially diversified take one or more confidence levels into account. A confidence level indicates a degree of certainty in the estimation of to what extent the received reference signals are received spatially diversified. Spatially diversified means that the references signals are e.g. originating from different radio network nodes and/or travel different propagation paths. This is exemplified in Action 302 in FIG. 3.

Action 404. The wireless device 10 generates the measurement report by adding selected reference signals into the measurement report, which reference signals are selected for simultaneous multiple transmissions of data to the wireless device 10 taking into account the estimated extent that the received reference signals are received spatially diversified. The wireless device 10 may generate the measurement report by taking one or more of: the estimated time difference of arrivals at the different antenna elements; the estimated time difference of arrivals of different reference signals; and the estimated power difference of the different polarization directions into account when selecting reference signals to add to the measurement report. The wireless device 10 may generate the measurement report by adding reference signals to the measurement report based on the measured signal strength or quality of received reference signals, and the estimation to what extent the references signals are spatially diversified. The simultaneous multiple transmissions may define or be defined by a rank being equal or higher than two for MIMO transmissions. This is exemplified in Action 304 in FIG. 3.

Action 405. The wireless device 10 transmits the measurement report to a radio network node such as the radio network node 12 or the second radio network node 13 in the wireless communication network 1. This is exemplified in Action 305 in FIG. 3.

Action 406. The wireless device 10 may then receive data over simultaneous multiple transmissions using beams of reference signals added into the measurement report. That is, the wireless device 10 may receive data over beams simultaneously, which beams are corresponding to two or more reference signals previously added into the measurement report. As stated above in action 306, the radio network node 12 or the scheduler of the radio network node determines what beams to use taking into account also other wireless devices' reports and other means of estimating throughput.

Figure 5:
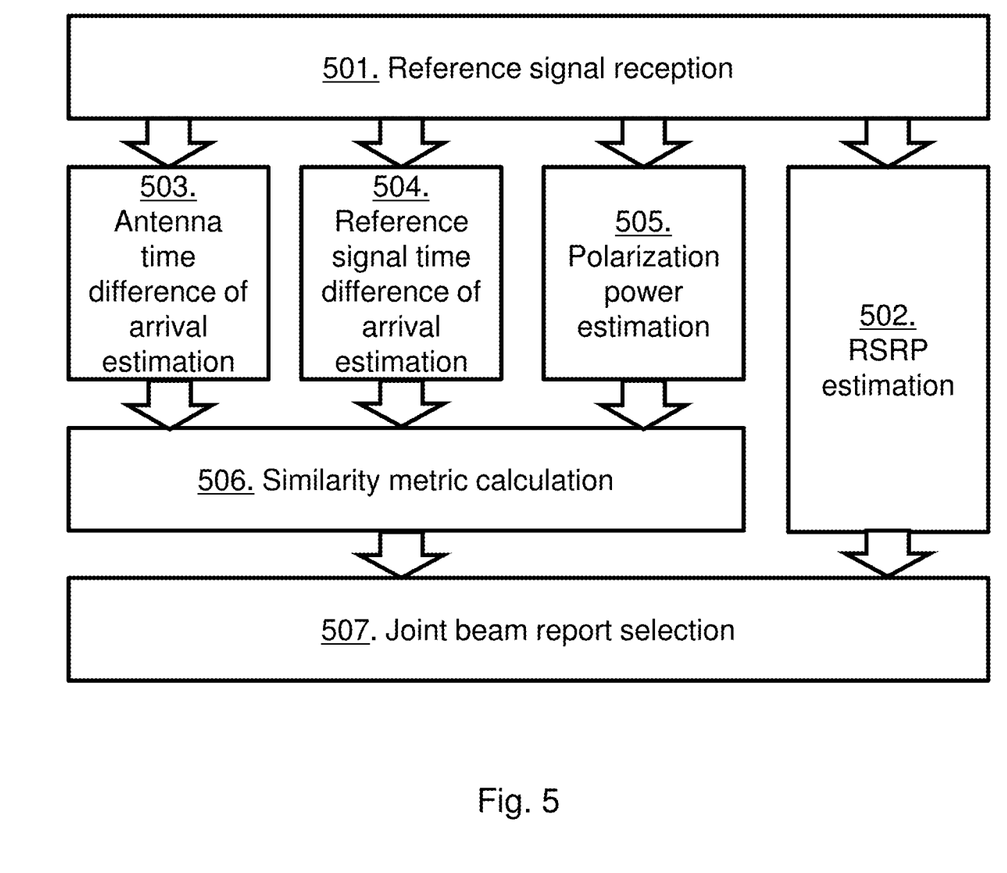
FIG. 5 is a schematic flowchart depicting one method performed by a wireless device according to embodiments herein.

FIG. 5 is a schematic flowchart depicting a method performed by the wireless device 10 for managing communication toward the wireless device.

The actions do not have to be taken in the order stated below, but may be taken in any suitable order. Actions performed in some embodiments are marked with dashed boxes.

Action 501. The wireless device 10 receives reference signals as mentioned in actions 301 and 401 herein.

Action 502. The wireless device 10 measures or estimates signal strength or quality, such as RSRP, of the different received reference signals. The wireless device 10 may e.g. select a first reference signal with a strongest or highest signal strength or quality measured as a reference point.

Action 503. As stated above the wireless device 10 estimates to what extent the received reference signals are received spatially diversified, see actions 302 and 403 above. This may be performed in the flowing way described in actions 503-506. The wireless device 10 may estimate a first received direction 'd' of a received reference signal, e.g. as performed in MIMO radar, and a first confidence level 'c_d'. The confidence level indicates the degree of certainty in the estimation of to what extent the received reference signals are received spatially diversified e.g. received from different directions. The direction may be in degrees e.g. d=[0, 360] and may be determined relative the first reference signal or as an absolute value. The confidence level c_d expresses how certain the direction estimation is. In essence, the estimated direction will give a distribution of how likely the signal came from all directions. For example, the confidence level may be in the interval [0, 1], where 0 means that all directions are equally likely and 1 would mean that the distribution only has a single peak i.e. the direction is certain. The confidence level may depend on a noise level of the reference signal, as well as on synchronization errors between antenna elements.

Action 504. The wireless device 10 may, additionally or alternatively, then estimate the length 'l' of the propagation path in meters of the second reference signal. There is a second confidence level 'c_l' of the length. One way to define this would be by estimating a standard deviation sigma_l of the length estimate. Then c_l could be defined as 1-(sigma_l/l). This means that c_l=1 corresponds to a very small standard deviation with respect to the total length, i.e. very likely the estimated length.

Action 505. The wireless device 10 may, additionally or alternatively, estimate a power fraction, for instance the fraction between horizontal power and total power f=P_H/(P_V+P_H). Again, a third confidence level 'c_f' depends on the standard deviation of P_H and P_V.

Action 506. The wireless device 10 may calculate a metric for the similarity of each pair of reference signals/beams, taking the estimates described above into account, this may be denoted similarity metric calculation. The y reported reference signals are then selected by maximizing a metric that depends on the RSRP values as well as on the similarity of the selected beams. For example, for each pair of beams, direction, length and power fraction may be estimated along with corresponding confidence levels for reference signals of the pair of beams. The first direction of the first beam is denoted as d_1 and the first confidence level of the first direction is denoted c_d1. The second direction of the second beam is denoted as d_2 and the second confidence level of the second direction is denoted c_d2. The first propagation path length of the first beam is denoted as l_1 and the first confidence level of the first propagation path length is denoted c_l1. The second propagation path length of the second beam is denoted as l_2 and the second confidence level of the second propagation path length is denoted c_l2. The first power fraction of the first beam is denoted as f_1 and the first confidence level of the first power fraction is denoted c_f1. The second power fraction of the second beam is denoted as f_2 and the second confidence level of the second power fraction is denoted c_f2. Dissimilarity of the two beams with respect to d, l, f as delta_d=|d_1−d_2|, delta_l=|l_1−l_2|, and delta_f=|f_1−f_2| and so on. Finally, the dissimilarity of the beams with respect to all estimates is Delta where $$\text{Delta} = w\_d * \text{delta}\_d * \min(c\_d1, c\_d2) + w\_l * \text{delta}\_l * \min(c\_l1, c\_l2) + w\_d * \text{delta}\_f * \min(c\_f1, c\_f2),$$

where w_d, w_l, w_f are factors that may be used to determine the weight of the three estimations. The factors may be tuned.

Action 507. The wireless device may then perform a joint beam report selection. The wireless device 10 may have all the dissimilarities Delta_xy for all pairs (x,y) of beams and based on this information the wireless device 10 selects which set of beams to report in the measurement report. The wireless device 10 may test all possible subsets but may perform a greedy approach such as:
- select a first beam b_1 with strongest BRS;
- select a second beam b_2 that has best joint performance with b_1 by maximizing e.g. max_i (BRS_i/Delta_1,i), where BRS_i is signal strength of BRS_i;
- select a third beam b_3 that has best joint performance with b_1 and b_2: max_i (BRS_i/(Delta_1,i+Delta_2,i))

And so on.

The wireless device 10 then reports not the strongest reference signals, but the reference signals that correspond to good beam candidates for MIMO transmissions. I.e. beams that are likely to provide high throughput using multiple data transmissions, simultaneously, toward the wireless device 10.

Figure 6:
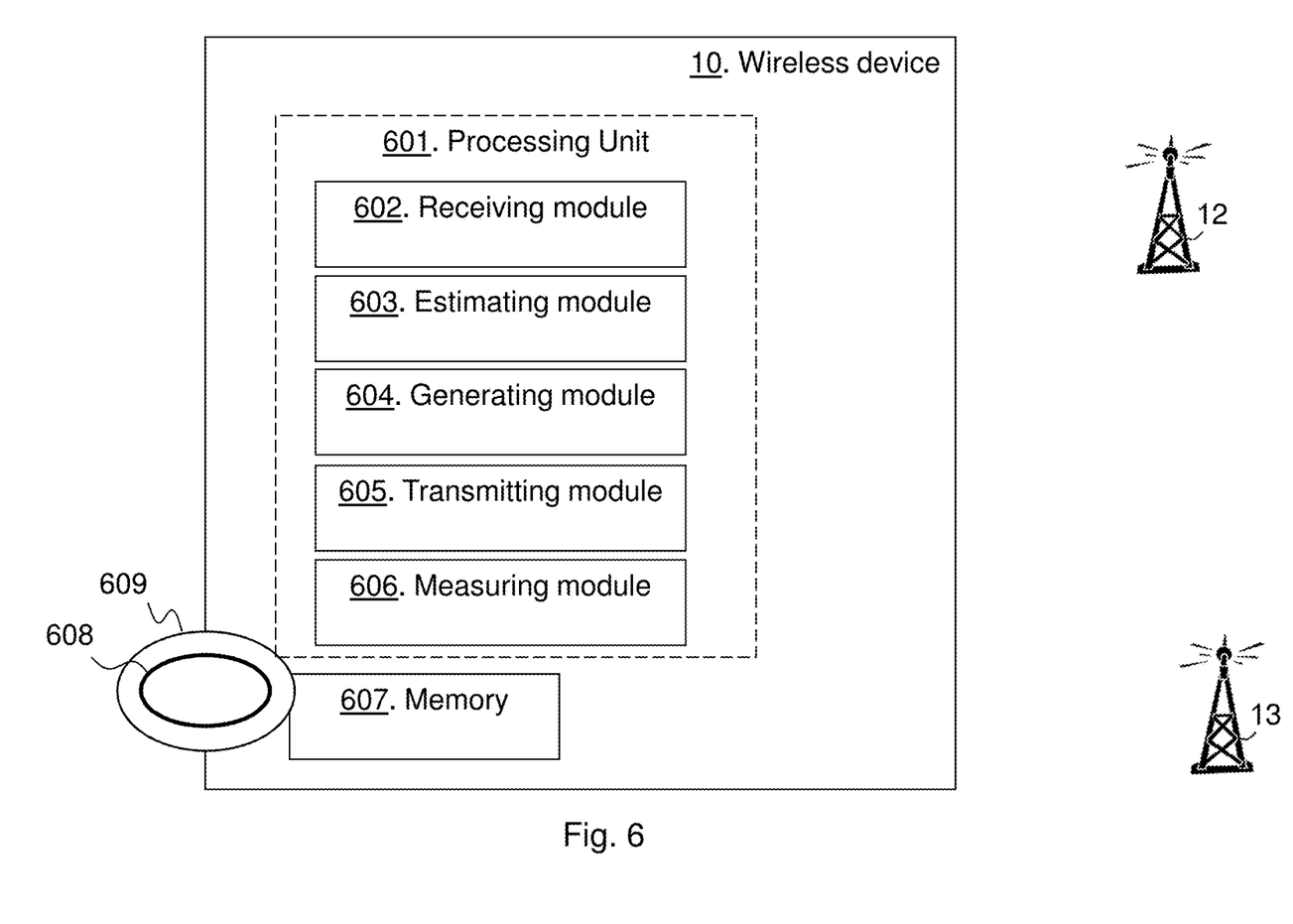
FIG. 6 is a block diagram depicting a wireless device according to embodiments herein.

FIG. 6 is a block diagram depicting the wireless device 10 for managing communication in the wireless communication network 1 according to embodiments herein.

The wireless device 10 may comprise a processing unit 601, e.g. one or more processors, configured to perform the methods herein.

The wireless device 10 may comprise a receiving module 602, e.g. a receiver or a transceiver. The wireless device 10, the processing unit 601 and/or the receiving module 602 is configured to receive reference signals from one or more radio network nodes.

The wireless device 10 may comprise an estimating module 603. The wireless device 10, the processing unit 601 and/or the estimating module 603 is configured to estimate to what extent the received reference signals are received spatially diversified. The wireless device 10, the processing unit 601 and/or the estimating module 603 may be configured to estimate to what extent the received reference signals are received spatially diversified by being configured to estimate the time difference of arrivals of a received reference signal at different antenna elements of the wireless device 10. The wireless device 10, the processing unit 601 and/or the estimating module 603 may be configured to estimate to what extent the received reference signals are received spatially diversified by being configured to estimate the time difference of arrivals of different reference signals at the wireless device 10. The wireless device 10, the processing unit 601 and/or the estimating module 603 may be configured to estimate to what extent the received reference signals are received spatially diversified by being configured to estimate the power difference of different polarization directions of the reference signal at the wireless device 10. The wireless device 10, the processing unit 601 and/or the estimating module 603 may be configured to estimate to what extent the received reference signals are received spatially diversified by being configured to take one or more confidence levels into account indicating a degree of certainty in the estimation of to what extent the received reference signals are received spatially diversified.

The wireless device 10 may comprise a generating module 604. The wireless device 10, the processing unit 601 and/or the generating module 604 is configured to generate the measurement report by adding the selected reference signals into the measurement report. The reference signals are selected for simultaneous multiple transmissions of data to the wireless device 10 taking into account the estimated extent that the received reference signals are received spatially diversified. The wireless device 10, the processing unit 601 and/or the generating module 604 may be configured to generate the measurement report by being configured to take one or more of the estimated time difference of arrival at different antenna elements; the estimated time difference of arrival of different reference signals, and the estimated power difference of different polarization directions into account when selecting reference signals to add to the measurement report.

The wireless device 10 may comprise a transmitting module 605, e.g. a transmitter or a transceiver. The wireless device 10, the processing unit 601 and/or the transmitting module 605 is configured to transmit the measurement report to a radio network node, e.g. the radio network node 12, in the wireless communication network 1.

The wireless device 10 may comprise a measuring module 606. The wireless device 10, the processing unit 601 and/or the measuring module 605 may be configured to measure the signal strength or quality of the received reference signals. The wireless device 10, the processing unit 601 and/or the generating module 604 may be configured to generate the measurement report by being configured to add reference signals to the measurement report based on the measured signal strength or quality of received reference signals and the estimation to what extent the references signals are spatially diversified.

The wireless device 10, the processing unit 601 and/or the receiving module 602 may further be configured to receive data over simultaneous multiple transmissions, which multiple transmissions use beams with reference signals added into the measurement report.

The wireless device 10 further comprises a memory 607. The memory comprises one or more units to be used to store data on, such as data relating to reference signals, signal strengths or qualities, IDs of reference signals, spatial diversity information, confidence levels, applications to perform the methods disclosed herein when being executed, and similar.

The methods according to the embodiments described herein for the wireless device 10 are respectively implemented by means of e.g. a computer program 708 or a computer program product, comprising instructions, i.e., software code portions, which, when executed on at least one processor, cause the at least one processor to carry out the actions described herein, as performed by the wireless device 10. The computer program 708 may be stored on a computer-readable storage medium 709, e.g. a disc or similar. The computer-readable storage medium 709, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, Personal Digital Assistant (PDA), PAD, Tablet, mobile terminals, smart phone, laptop embedded equipped (LEE), laptop mounted equipment (LME), Universal Serial Bus (USB) dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

Measurement Reference Signal (MRS): As used herein, a "MRS" is any signal used for mobility measurements in beams. Thus, while the term "MRS" is used herein to refer a signal used herein, the term "MRS" is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purposes. This reference signal can be periodic or aperiodic. It can be configured to be wireless device specific or could be used common for more than one wireless device.

Antenna node: As used herein, an "antenna node" is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for managing communication in a wireless communication network, the method comprising:
receiving reference signals from one or more radio network nodes;
estimating to what extent the received reference signals are received spatially diversified, wherein the estimating to what extent the received reference signals are received spatially diversified comprises estimating a time difference of arrivals of a received reference signal at different antenna elements of the wireless device;
generating a measurement report by adding selected reference signals into the measurement report, which reference signals are selected for simultaneous multiple transmissions of data to the wireless device taking into account the estimated extent that the received reference signals are received spatially diversified;
transmitting the measurement report to a radio network node in the wireless communication network; and
receiving data over simultaneous multiple transmissions using beams of reference signals added into the measurement report.

2. The method according to claim 1, wherein the estimating to what extent the received reference signals are received spatially diversified comprises estimating a time difference of arrivals of different reference signals at the wireless device.

3. The method according to claim 1, wherein the estimating to what extent the received reference signals are received spatially diversified comprises estimating a power difference of different polarization directions of a reference signal at the wireless device.

4. The method according to claim 1, wherein the generating the measurement report takes one or more of the estimated time difference of arrivals at different antenna elements; the estimated time difference of arrivals of different reference signals, and the estimated power difference of different polarization directions into account when selecting reference signals to add to the measurement report.

5. The method according to claim 1, wherein the estimating to what extent the received reference signals are received spatially diversified takes one or more confidence levels into account indicating a degree of certainty in the estimation of to what extent the received reference signals are received spatially diversified.

6. The method according to claim 1, further comprising:
measuring signal strength or quality of the received reference signals and the generating the measurement report comprises adding reference signals to the measurement report based on the measured signal strength or quality of received reference signals, and the estimation to what extent the references signals are spatially diversified.

7. A computer program product comprising a non-transitory computer-readable storage medium, having stored thereon a computer program comprising instructions which, when executed on at least one processor, cause the at least one processor to carry out the method according to claim 1.

8. A wireless device for enabling managing communication in a wireless communication network, wherein the wireless device comprises:
a processor; and memory, said memory comprising instructions executable by said processor whereby said wireless device is operative to, receive reference signals from one or more radio network nodes, estimate to what extent the received reference signals are received spatially diversified, wherein estimating to what extent the received reference signals are received spatially diversified, said wireless device is operative to estimate a time difference of arrivals of a received reference signal at different antenna elements of the wireless device, generate a measurement report by adding selected reference signals into the measurement report, which reference signals are selected for simultaneous multiple transmissions of data to the wireless device taking into account the estimated extent that the received reference signals are received spatially diversified, transmit the measurement report to a radio network node in the wireless communication network, and receive data over simultaneous multiple transmissions, which multiple transmissions use beams with reference signals added into the measurement report.

9. The wireless device according to claim 8, wherein said memory further comprises instructions executable by said processor whereby said wireless device is operative to, estimate to what extent the received reference signals are received spatially diversified by being configured to estimate a time difference of arrivals of different reference signals at the wireless device.

10. The wireless device according to claim 8, wherein said memory further comprises instructions executable by said processor whereby said wireless device is operative to, estimate to what extent the received reference signals are received spatially diversified by being configured to estimate a power difference of different polarization directions of a reference signal at the wireless device.

11. The wireless device according to claim 8, wherein said memory further comprises instructions executable by said processor whereby said wireless device is operative to, generate the measurement report by being configured to take one or more of the estimated time difference of arrival at different antenna elements; the estimated time difference of arrival of different reference signals, and the estimated power difference of different polarization directions into account when selecting reference signals to add to the measurement report.

12. The wireless device according to claim 8, wherein said memory further comprises instructions executable by said processor whereby said wireless device is operative to, estimate to what extent the received reference signals are received spatially diversified by being configured to take one or more confidence levels into account indicating a degree of certainty in the estimation of to what extent the received reference signals are received spatially diversified.

13. The wireless device according to claim 8, wherein said memory further comprises instructions executable by said processor whereby the said wireless device is operative to, measure signal strength or quality of the received reference signals and to generate the measurement report by being configured to add reference signals to the measurement report based on the measured signal strength or quality of received reference signals, and the estimation to what extent the references signals are spatially diversified.

* * * * *